(12) United States Patent
Van Der Stok

(10) Patent No.: US 8,935,426 B2
(45) Date of Patent: Jan. 13, 2015

(54) ROUTING MESSAGES OVER A NETWORK OF INTERCONNECTED DEVICES OF A NETWORKED CONTROL SYSTEM

(75) Inventor: Petrus Desiderius Victor Van Der Stok, Helmond (NL)

(73) Assignee: Koninklijke Philips N.V., Eindhoven (NL)

( * ) Notice: Subject to any disclaimer, the term of this patent is extended or adjusted under 35 U.S.C. 154(b) by 204 days.

(21) Appl. No.: 13/203,249

(22) PCT Filed: Feb. 19, 2010

(86) PCT No.: PCT/IB2010/050737
§ 371 (c)(1),
(2), (4) Date: Jan. 9, 2012

(87) PCT Pub. No.: WO2010/097738
PCT Pub. Date: Sep. 2, 2010

(65) Prior Publication Data
US 2012/0096181 A1    Apr. 19, 2012

(30) Foreign Application Priority Data

Feb. 26, 2009 (EP) ...................................... 09153736
Jul. 24, 2009 (EP) ...................................... 09166323

(51) Int. Cl.
*G06F 13/372* (2006.01)
*H04L 12/733* (2013.01)
(Continued)

(52) U.S. Cl.
CPC ............ *H05B 37/0272* (2013.01); *H04L 45/20* (2013.01); *H05B 37/0254* (2013.01); *H04L*
(Continued)

(58) Field of Classification Search
CPC ....... H04L 12/28; H04L 12/26; H04W 40/00;
G06G 11/00; H05L 45/22; H05L 45/06;
H05L 45/20; H05L 45/28; H05B 37/0272;
H05B 37/0254
USPC .................. 709/218, 238, 235, 239; 370/242;
455/453
See application file for complete search history.

(56) References Cited

U.S. PATENT DOCUMENTS 5,568,361 A * 10/1996 Ward et al. .................... 361/735
(Continued)

FOREIGN PATENT DOCUMENTS

EP          1091334 B1     4/2001
(Continued)

OTHER PUBLICATIONS

Van De Stok et al., "Auto commissioning of grid-based lighting systems using Coded Light", Invention Disclosure, 2003, pp. 1-17, Koninklijke Philips Electronics N.V.
(Continued)

*Primary Examiner* — Chandrahas Patel
*Assistant Examiner* — Lan Huong Truong

(57) ABSTRACT

The invention relates to routing messages over a network of interconnected devices of a networked control system, particularly to routing messages for individually controlling devices of a networked control system such as light sources of a lighting system. A basic idea of the invention is to determine a routing path for a message from a sender device to a destination device through the grid of interconnected devices of a networked control system, and to change the routing path, when a faulty device is contained in the routing path, in order to route the message around the faulty device, instead of determining an entirely new routing path. Thus, an efficient routing of a message over a network of interconnected device may be provided. An embodiment of the invention provides a method for routing messages over a network of interconnected devices (10, 12, 14, 16, 18) of a networked control system (20), wherein the devices are arranged in an approximately rectangular grid and each device (10) is adapted for routing messages, which were received from directly neighbored devices (12, 14, 16, 18) in the grid, to directly neighbored devices (12, 14, 16, 18) in the grid, wherein the routing comprises the acts of
determining a routing path for a message from a sender device to a destination device through the grid (S10),
routing the message from the sender device to the destination device along the determined routing path through the grid (S12), and
changing the routing path according to a predetermined routing rule for routing the message around a faulty device contained in the determined routing path (S14).

2 Claims, 7 Drawing Sheets

(51) Int. Cl.
  *H05B 37/02* (2006.01)
  *H04L 12/703* (2013.01)
  *H04L 12/707* (2013.01)
  *H04L 12/721* (2013.01)

(52) U.S. Cl.
  CPC ......... 45/28 (2013.01); *H04L 45/22* (2013.01); *H04L 45/06* (2013.01)
  USPC ....................................................... 709/239

(56) References Cited

U.S. PATENT DOCUMENTS

| | | | |
|---|---|---|---|
| 5,689,646 A | | 11/1997 | Thorson |
| 6,141,319 A | * | 10/2000 | Dighe et al. ................ 370/218 |
| 6,349,090 B1 | * | 2/2002 | Lewis et al. ................ 370/238 |
| 7,230,924 B2 | * | 6/2007 | Chiu et al. ................ 370/237 |
| 2004/0160199 A1 | | 8/2004 | Morgan et al. |
| 2005/0041654 A1 | | 2/2005 | Lee |
| 2009/0161578 A1 | * | 6/2009 | Yeung et al. ................ 370/254 |
| 2011/0141877 A1 | * | 6/2011 | Xu et al. ................ 370/216 |

FOREIGN PATENT DOCUMENTS

| | | |
|---|---|---|
| EP | 1855398 A1 | 11/2007 |
| WO | 2004075599 A1 | 9/2004 |
| WO | 2007102114 A1 | 9/2007 |
| WO | 2007102097 A1 | 11/2007 |

OTHER PUBLICATIONS

O'Brien et al., "Short Range Optical Wireless Communications", Wireless World Research Forum, pp. 1-11, 2005.

* cited by examiner

| FN | PL | dead | lost | | +0 hops | | +2 hops | | +4 hops | | >+6 hops | |
|---|---|---|---|---|---|---|---|---|---|---|---|---|
| | | | bc | gr | bc | gr | bc | gr | bc | gr | bc | gr |
| 10 | 5 | 2 | 0 | 1 | 80 | 95 | 18 | 2 | | | | |
| | 10 | 1 | 0 | 0 | 75 | 94 | 17 | 5 | 5 | | 2 | |
| | 15 | 0 | 0 | 0 | 72 | 94 | 17 | 6 | 11 | | | |
| | 20 | 0 | 0 | 0 | 71 | 97 | 15 | 3 | 8 | | 6 | |
| 30 | 5 | 3 | 0 | 0 | 81 | 95 | 15 | 2 | 1 | | | |
| | 10 | 0 | 0 | 0 | 79 | 94 | 18 | 4 | 3 | 2 | | |
| | 15 | 1 | 0 | 0 | 69 | 92 | 17 | 6 | 12 | | 1 | |
| | 20 | 5 | 0 | 0 | 61 | 84 | 19 | 10 | 7 | 0 | 8 | 1 |
| 50 | 5 | 6 | 0 | 0 | 78 | 83 | 16 | 10 | | 1 | | |
| | 10 | 3 | 0 | 1 | 74 | 80 | 16 | 14 | 6 | 1 | 1 | 1 |
| | 15 | 1 | 0 | 1 | 69 | 79 | 23 | 17 | 5 | 1 | 2 | 1 |
| | 20 | 9 | 0 | 1 | 59 | 73 | 20 | 15 | 7 | 2 | 5 | |
| 70 | 5 | 5 | 0 | 1 | 78 | 90 | 17 | 4 | | | | |
| | 10 | 7 | 0 | 0 | 69 | 75 | 19 | 17 | 5 | 1 | | |
| | 15 | 4 | 0 | 0 | 64 | 77 | 20 | 16 | 11 | 2 | 1 | 1 |
| | 20 | 8 | 0 | 1 | 52 | 62 | 28 | 18 | 8 | 5 | 4 | 6 |
| 90 | 5 | 8 | 0 | 2 | 74 | 73 | 18 | 16 | | 0 | | 1 |
| | 10 | 2 | 0 | 0 | 66 | 73 | 23 | 19 | 9 | 3 | | 3 |
| | 15 | 8 | 0 | 0 | 58 | 67 | 24 | 19 | 7 | 2 | 3 | 4 |
| | 20 | 4 | 0 | 0 | 59 | 65 | 26 | 24 | 5 | 1 | 6 | 6 |
| 110 | 5 | 8 | 0 | 1 | 74 | 76 | 16 | 14 | 2 | 1 | | |
| | 10 | 4 | 0 | 0 | 68 | 80 | 24 | 15 | 4 | 1 | | |
| | 15 | 14 | 0 | 1 | 50 | 56 | 25 | 23 | 9 | 5 | 2 | 1 |
| | 20 | 10 | 0 | 2 | 51 | 55 | 28 | 23 | 7 | 6 | 4 | 4 |
| 130 | 5 | 8 | 0 | 3 | 72 | 82 | 15 | 4 | 1 | 0 | 1 | 3 |
| | 10 | 14 | 0 | 1 | 59 | 68 | 19 | 12 | 8 | 1 | | 4 |
| | 15 | 8 | 0 | 1 | 52 | 49 | 25 | 32 | 14 | 4 | 1 | 6 |
| | 20 | 11 | 0 | 0 | 42 | 47 | 32 | 32 | 10 | 3 | 5 | 7 |
| 150 | 5 | 8 | 0 | 0 | 73 | 75 | 17 | 11 | 2 | 2 | | 4 |
| | 10 | 14 | 0 | 2 | 53 | 58 | 30 | 18 | 3 | 2 | | 6 |
| | 15 | 5 | 0 | 1 | 51 | 50 | 31 | 33 | 10 | 7 | 3 | 4 |
| | 20 | 8 | 0 | 0 | 46 | 42 | 27 | 31 | 10 | 10 | 9 | 9 |
| 170 | 5 | 18 | 0 | 2 | 61 | 59 | 21 | 17 | | 1 | | 3 |
| | 10 | 14 | 0 | 5 | 53 | 53 | 27 | 18 | 4 | 3 | 2 | 7 |
| | 15 | 18 | 0 | 3 | 49 | 45 | 20 | 22 | 9 | 4 | 4 | 9 |
| | 20 | 17 | 0 | 3 | 35 | 35 | 28 | 22 | 11 | 14 | 9 | 9 |
| 190 | 5 | 19 | 0 | 0 | 62 | 63 | 17 | 13 | | 1 | | 2 |
| | 10 | 14 | 0 | 3 | 61 | 61 | 23 | 17 | 2 | 3 | | 2 |
| | 15 | 13 | 0 | 0 | 40 | 42 | 32 | 33 | 13 | 6 | 2 | 6 |
| | 20 | 30 | 0 | 2 | 35 | 33 | 23 | 17 | 9 | 8 | 3 | 10 |
| 210 | 5 | 10 | 0 | 0 | 59 | 63 | 28 | 18 | 1 | 4 | 2 | 5 |
| | 10 | 11 | 0 | 5 | 47 | 47 | 29 | 25 | 7 | 3 | 6 | 9 |
| | 15 | 14 | 0 | 4 | 45 | 45 | 27 | 22 | 9 | 6 | 2 | 9 |
| | 20 | 13 | 0 | 4 | 40 | 40 | 22 | 18 | 19 | 12 | 6 | 13 |

FIG. 9

ROUTING MESSAGES OVER A NETWORK OF INTERCONNECTED DEVICES OF A NETWORKED CONTROL SYSTEM

FIELD OF THE INVENTION

The invention relates to routing messages over a network of interconnected devices of a networked control system, particularly to routing messages for individually controlling devices of a networked control system such as light sources of a lighting system.

BACKGROUND OF THE INVENTION

Networked control systems are a ubiquitous trend in commercial, industrial and institutional business markets and also in consumer markets. An example of a networked control system is a complex lighting system with dozens of light sources. Examples of professional environments are lighting systems applied in green houses, factory buildings, sport halls, office buildings and outdoor (matrix) light displays. Particularly, in professional environments it becomes more and more interesting to control devices of a networked control system on an individual and local basis, for example in order to save energy in large lighting systems.

Devices of networked control system such as luminaires of a lighting system can be controlled by sending messages over a wired or a wireless medium. Wireless is attractive because it reduces installation costs and makes the installation more flexible. One of the major drawbacks of wireless networks is the instability of the routing of the messages over the network of devices usually leading to large number of message drops. The cause of the instability is the maintenance of paths over the network, because every time a link fails, new paths have to be found and broadcasted over the network.

WO2007/102114A1 relates to grouping of wireless communication nodes in a wireless communication network, which are configured to control the operation of luminaries in a lighting array. A computer algorithm for grouping a derived spatial arrangement of wireless communication nodes is provided. The position of each node in the communication network corresponds to the position of a particular luminaire in the lighting array. The algorithm divides the arrangement of nodes into a plurality of spatial groups, each of which is defined by a line which joins the group's member nodes together. The groups are ranked according to their statistical attributes and a number of groups are selected as control groups, such that the member nodes, and hence luminaries, of each control group may be controlled by a single switch or sensor.

SUMMARY OF THE INVENTION

It is an object of the invention to provide a system, method, and device(s) for routing messages over a network of interconnected devices of a networked control system.

The object is solved by the subject matter of the independent claims. Further embodiments are shown by the dependent claims.

A basic idea of the invention is to determine a routing path for a message from a sender device to a destination device through the grid of interconnected devices of a networked control system, and to change the routing path, when a faulty device is contained in the routing path, in order to route the message around the faulty device, instead of determining an entirely new routing path. Thus, an efficient routing of a message from a sender device to a destination device over a network of interconnected devices such as luminairies of a networked lighting system may be provided. A faulty device is particularly a device, which is not able to communicate with neighbored devices, i.e. to receive messages from and send messages to devices neighbored to the faulty device in the grid. A grid in the context of the present application may be a two-dimensional or even a three-dimensional arrangement of devices, which are interconnected in that each device can receive messages from and send messages to directly neighbored devices in the grid. A routing path means an order of devices of the grid with a sender device at the beginning of the order and a destination at the end of the order. In other words, a routing path describes the path of a message through the grid by specifying all devices, which receive the message from a preceding device and forward it to the next device in the order so that the messages "hops" along the routing path from one device to another one through the grid.

An embodiment of the invention provides a method for routing messages over a network of interconnected devices of a networked control system, wherein the devices are arranged in an approximately rectangular grid and each device is adapted for routing messages, which were received from directly neighbored devices in the grid, to directly neighbored devices in the grid, wherein the routing comprises the acts of determining a routing path for a message from a sender device to a destination device through the grid, routing the message from the sender device to the destination device along the determined routing path through the grid, and changing the routing path according to a predetermined routing rule for routing the message around a faulty device contained in the determined routing path.

An interconnection of devices particularly means a communication connection between devices allowing each device to transmit and receive messages from devices neighbored to it in the grid. A device may be any kind of a networked control system device, particularly a communication node of a networked control system, which may be adapted to control other devices connected to it. For example, a device may be node of the grid with a certain network address in order to allow a addressing by a central controller and integrated control functionality for other devices connected to the node, such as luminairies connected to the node. The networked control system can be a complex lighting system with dozens of interconnected luminairies arranged in a grid, such as for example a lighting system installed in a green house, a hall, a large building, a hotel lobby, a large office.

The determining of a routing path for a message from a sender device to a destination device through the grid may comprise determining a vector by means of the coordinates of the sender device and the destination device in the grid, calculating axes in the grid from the vector coordinates, and determining the routing path from the calculated axes.

This allows determining the routing path as a combination of straight paths in the grid. For example, in a two-dimensional approximately rectangular grid, each device of the grid may have a tupel of coordinates in order to identify the location of each device. The vector may then be determined by the coordinates tuples of the sender device and the destination device in the grid. An axis may be calculated from the tuples by subtracting the respective components of the tuples.

The routing of the message from the sender device to the destination device along the determined routing path through the grid may comprise for each device of the routing path checking a connection link to the next neighbored device in the routing direction and if the connection link is working sending the message to the next neighbored device of the routing path else marking the next neighbored device of the routing routing path as faulty and changing the routing path.

Thus, a connection link between two neighbored devices may be taken as a indication for a faulty device. Naturally, not only connection problems may indicate faulty devices. It is also possible that a faulty device may be able to communicate with neighbored devices, but not be able to route a received message.

The changing of the routing path according to a predetermined routing rule for routing the message around a faulty device contained in the determined routing path may comprise performing the following acts for sending of the message from one device to a neighbored device:

a) determining a changed routing direction,
b) checking a connection link to the next neighbored device in the changed routing direction and
c) if the connection link is working sending the message to the next neighbored device in the changed routing direction else repeating steps a)-c).

According to this embodiment, the routing method selects a new routing direction, when the next device in the selected routing direction is able to build up a working connection link to that device, which actually stored the message to be routed and looks for a device, to which the message may be forwarded.

The determining of the changed routing direction may comprise changing the routing direction in a first order of predetermined routing directions up, left, down or the reverse first order if the routing direction of the determined routing path is from right in the grid, changing the routing direction in a second order of predetermined routing directions left, down, right or the reverse second order if the routing direction of the determined routing path is from up in the grid, changing the routing direction in a third order of predetermined routing directions down, right, up or the reverse third order if the routing direction of the determined routing path is from left in the grid, changing the routing direction in a fourth order of predetermined routing directions right, up, left or the reverse fourth order if the routing direction of the determined routing path is from down in the grid.

These routing rules define a preferred routing direction choice which depends on the routing direction, from which a message is received. The order of predetermined routing directions means that the first one of the routing directions is selected, and if this direction cannot be used for example due to a connection error, the second one is used and so on.

Either the order of predetermined routing directions or the reverse order may be selected as default order of changing the routing direction and the default order of changing the routing direction is switched to the reverse order if a communication link to the next neighbored device in the selected routing direction of the default order is faulty or no device exists in the selected routing direction.

Thus, either a clockwise or counter-clockwise routing direction selection may be set as default order.

The changing of the routing path according to a predetermined routing rule for routing the message around a faulty device contained in the determined routing path may further comprise storing an identification of the device, which inititates the changing of the routing path, in the message, comparing the identification stored in the message by each device of the changed routing path with its own identification, and terminating the routing of the message if the comparison results in that the stored identification corresponds to the identification of the comparing device.

This allows to avoid that a message loops around in the grid and revisits the device, which initiated a change of the routing direction. If a message revisits the device, this is normally an indication, that the destination device is surrounded by faulty devices and is therefore, unreachable by changing the routing direction.

The method changing of the routing path according to a predetermined routing rule for routing the message around a faulty device contained in the determined routing path may further comprise storing a hop counter in the message by the device, which initiates the changing of the routing path, incrementing the hop counter by each device, which receives the message and sends it to a further device, comparing the hop counter stored in the message by a device of the changed routing path with a maximum hop counter value, and terminating the routing of the message if the comparison results in that the stored hop counter is equal or larger than the maximum hop counter value.

The hop counter is an indicator of the devices visited by a message on its path over the grid. Thus, the hop counter can be checked by each device, only certain devices or only device in the grid for exceeding the maximum hop counter value in order to terminate the routing, when a message "travels" too long through the grid. This is helpful for terminating message routing to the destination device, which is surrounded with a large number of faulty device and the efforts to reach this device could be too high, for example the time required for sending a control message to the destination device should not exceed a maximum routing time span.

An embodiment of the invention provides a computer program enabling a processor to carry out the method according to the invention and as described above. The processor may be for example implemented in a device of a networked control system such as in a luminary of a lighting system with interconnected lamps. Thus, a device such as a central controller of a lighting system may route a control message for controlling luminaries at a certain location through a grid of interconnected luminairies, and each luminary of the grid may be enabled by a processor executing a computer program implementing the method according to the invention to route the message to the destination device.

According to a further embodiment of the invention, a record carrier storing a computer program according to the invention may be provided, for example a CD-ROM, a DVD, a memory card, a diskette, internet memory device or a similar data carrier suitable to store the computer program for optical or electronic access.

A further embodiment of the invention provides a computer programmed to perform a method according to the invention such as a PC (Personal Computer). The computer may be for example implement a central controller of a networked control system such as a lighting system or a HVAC (Heating, Ventilation, Air Conditioning) system in a building.

A further embodiment of the invention provides a system for routing messages over a network of interconnected devices of a networked control system, wherein the devices are arranged in an approximately rectangular grid and each device is adapted for routing messages, which were received from directly neighbored devices in the grid, to directly neighbored devices in the grid, wherein the system is adapted for performing the acts of determining a routing path for a message from a sender device to a destination device through the grid, routing the message from the sender device to the destination device along the determined routing path through the grid, and changing the routing path according to a predetermined routing rule for routing the message around a faulty device contained in the determined routing path.

The system may be further adapted to perform a method of the invention and as described above.

Furthermore, an embodiment of the invention relates to a device being adapted for application in a system of the invention and as described before and comprising communication means for receiving messages from and sending messages to other devices, and routing decision means for selecting a neighbored device, to which a message is to be sent, according to a determined routing path thorugh a grid of interconnected devices.

The device may be for example embodied as an integrated circuit, which may be implemented for example in a luminaire of a lighting system comprising several interconnected luminairies.

The routing decision means may be further adapted to change the routing path according to a predetermined routing rule for routing the message around a faulty device contained in the determined routing path by performing the following acts for every sending of a message to a neighbored device:

a) determining a changed routing direction, b) checking a connection link to the next neighbored device in the changed routing direction and c) if the connection link is working sending the message to the next neighbored device in the changed routing direction else repeating steps a)-c).

Furthermore, the routing decision means may be adapted to determine the changed routing direction according to the following rules:

changing the routing direction in a first order of predetermined routing directions up, left, down or the reverse first order if the routing direction of the determined routing path is from right in the grid, changing the routing direction in a second order of predetermined routing directions left, down, right or the reverse second order if the routing direction of the determined routing path is from up in the grid, changing the routing direction in a third order of predetermined routing directions down, right, up or the reverse third order if the routing direction of the determined routing path is from left in the grid, changing the routing direction in a fourth order of predetermined routing directions right, up, left or the reverse fourth order if the routing direction of the determined routing path is from down in the grid.

The routing decision means may be further adapted to select either the order of predetermined routing directions or the reverse order as default order of changing the routing direction and to switch the default order of changing the routing direction to the reverse order if a communication link to the next neighbored device in the selected routing direction of the default order is faulty or no device exists in the selected routing direction.

These and other aspects of the invention will be apparent from and elucidated with reference to the embodiments described hereinafter.

The invention will be described in more detail hereinafter with reference to exemplary embodiments. However, the invention is not limited to these exemplary embodiments.

BRIEF DESCRIPTION OF THE DRAWINGS

FIG. 9 shows a table with the results of simulations of an embodiment of a routing method according to the invention and of a broadcast routing method;

DETAILED DESCRIPTION OF EMBODIMENTS

Figure 1:
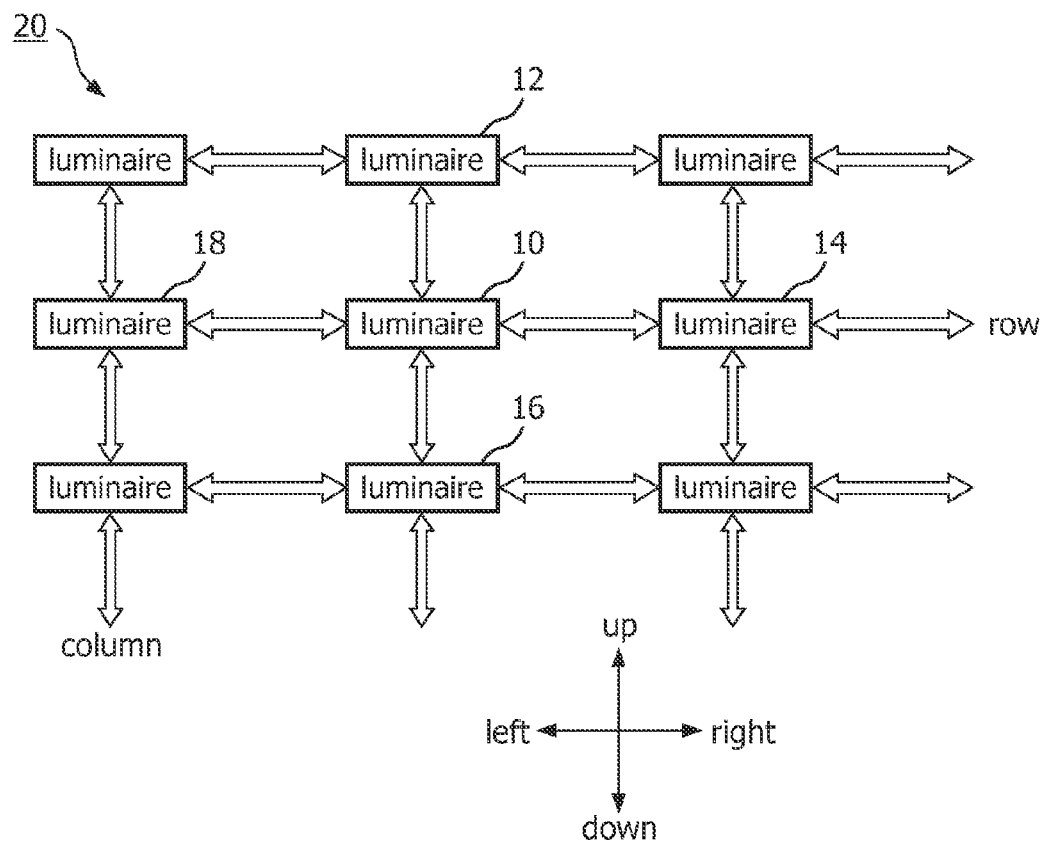
FIG. 1 shows an embodiment of a lighting system with luminaries arranged in a rectangular grid.

In the following, functionally similar or identical elements may have the same reference numerals. Even if embodiments of the invention, which are described in the following, relate to lighting systems, the invention is generally applicable to networked control systems, which comprise several device arranged in a grid. The term "light", "lighting unit" and "luminary" relate in the following to the same.

In professional environments it becomes more and more interesting to control lights of a complex lighting system on an individual and local basis. Examples of such environments are green houses, factory buildings, sport halls, office buildings and outdoor (matrix) light displays. Instead of switching on or off all luminaries, it is preferred to control single luminaries or groups of luminaries in order to locally create light effects in certain areas, for example in order to illuminate certain areas in an office building or to create light for only some plants in a certain place in a green house. Also, often it is required to individually control luminaries of a lighting system with for example a central controller of the lighting system. Complex lighting systems are usually organized as networked control system, which means that the devices of the system such as luminaries or groups of luminaries are part of a network and may be individually addressed and controlled for example by control messages. The control messages can be centrally generated, e.g. by a central controller such as computer provided for controlling luminaries of for example an outdoor (matrix) light display, but might also be based on local sensor findings, e.g. in a lighting system for greenhouses or offices.

Typically, individual control of luminaries in such networked lighting systems is done by attaching a communication node to each luminaire that needs to be controlled, e.g. ballast. The node may be integrated in the luminaire or attached as separate device. The addressable node corresponds to a device of a networked control system. A node may control a single luminaire or several luminaries. In a networked lighting system, each of the nodes has a unique network address, so that messages from a central controller can be directly addressed and routed to it. A message means any control command for controlling devices attached to an addressed node, for example "dimming of all luminaries connected to node with address xyz" or "activating the luminaire at node with address xyz". The messages or control commands are sent to a node or a group of nodes at a given location within a building or an environment, to regulate the lighting at its location.

Also, the luminaries of a lighting system are often organized in rectangular grids in professional environments. A connection between luminaries in a grid may be made either wired or wireless, for example via RF (Radio Frequency) or IR (Infrared) or visible light. Wireless communication connections of luminairies are very attractive since no expensive and complex wiring of the luminairies is usually required. However, wireless communication is usually more instable than a wired communication particularly due to interferences from other wireless sources. Thus, it may happen that a message sent from one luminary to another one via a wireless communication connection may be lost on its routing path due to a interfered wireless communication. But a message may not only be lost in networked control systems using wireless communication, but also in systems with a wired communication. For example, when a communication wire between two luminairies in a grid of luminairies of the networked lighting system is defect, or a luminary is out of order, for example is no longer able to communicate with other luminairies in the grid. Therefore, the routing of a message through a grid of devices of a networked control system, which uses either a wireless or a wired or even both communication, requires a versatile method of finding a routing path through the grid.

FIG. 1 shows an example of a networked lighting system 20 comprising luminaries, which are arranged in a rectangular grid. The luminairies correspond to the above mentioned nodes and are individually addressable in the grid. FIG. 1 shows also how the luminaries in the rectangular grid, depicted by rectangular boxes, are interconnected by wireless communication links represented by the double arrows. Each luminaire in the grid is connected to its directly neighbored luminaries, for example luminaire 10 is connected to luminaire 12 in the same column in the up direction, to luminaire 16 in the same column in the down direction, to luminaire 14 in the same row in the right direction, and to luminaire 18 in the same row in the left direction. A connection or link means a communication connection, over which a luminaire or node may transmit messages or commands to another directly neighbored luminaire or node. A message sent from a first luminaire to a second luminaire may be forwarded in a certain direction to a third luminaire in the grid and so on until the message is received by a luminaire with no direct neighbor in the predetermined direction. Messages or commands are sent to the luminaries or nodes by expressing their location in for example a destination specifier, contained in a message or command.

The luminaries may communicate wirelessly, for example via light created by the main light source of each luminaire. In order to create light cones for a directional light communication between luminairies, light collimators may be used. Alternatively also lenses can be applied to create the directional light. The light interconnections between luminaries may be realized with coded light, a technology for data transmission via visible light communication. The lamp in a luminaire emits a data stream that, depending on the light source type, ranges from a few kbps to a few hundreds of kbps. At the neighbor luminaire the light is received in a cone with a narrow opening angle, for example of 10°. The light transmitted by a luminaire may be non-directional, so that it can be received by all neighboring luminaries. Alternatively, also the emitted light may be directional. Then, it is necessary that different data are transmitted to the 4 different directions in the grid. This can be achieved by collimators feeding the light from the main light source. To be able to send independent messages to the different sides of the luminaire, the tubes can be equipped with a shutter which is only open ¼ of time. These shutters should be synchronized with the data transmitted by the main lamp in the luminaire, i.e. the shutter should be open when data should be emitted to that side. The receiver can be placed in the same tube to achieve directional reception. Alternatively the light interconnection may realized by means of additional light sources, added to the luminaries for the data communication. For example, this extra light source can be an IR LED (Infrared Light Emitting Diode). This has the advantage that this solution can also be used when the main light source is fully switched off More over, the different light sources can be modulated independently from the main light source, not requiring shutters as in the solution above. Coded Light technology as applicable for the present invention may apply the modulation of light from visible light sources. This allows embedding data in the light itself. The modulation can be designed such that it is invisible to the human eye. Such feature is particularly important for consumer applications since no light disturbance is tolerated. However, for professional applications like commissioning, data modulations that produce a certain level visible flickering might also be acceptable. Different types of light sources may employ different modulation schemes. As an example, different modulation schemes may be applied for solid state light (SSL) sources and fluorescent light sources. The modulation of other light sources, such as HID and Halogen, is also possible. As already mentioned above, also extra light sources can be added to allow the interconnection among luminaries. For example, IR LEDs may be used. A communication connection may alternatively or additionally be established by means of RF (Radio Frequency) communication, which allows also to bridge distances between neighbored devices which could not be bridged by light, for example around corners in a building or through faceplates or the like.

In the following, embodiments of the method for routing messages over a network of interconnected devices of a networked control system according to the invention are explained by means of a complex lighting system with several interconnected luminairies. In this lighting system, each luminaire is connected to a node. The node may be integrated in a luminary, or embodied as separate device coupled to a luminary. It is assumed that the nodes are placed on a grid as shown in FIG. 1 and can communicate with their direct neighbors in the up, right, left and down direction. A node position can be expressed as a [row, column] pair. A message routed from one node to another neighbored node is called a packet, since it may be routed through the grid by using packet communication protocol by the nodes. The direction of a packet at node "a" with end destination "b" is given by the packet vector ($row_b - row_a$, $column_b - column_a$).

Figure 2:
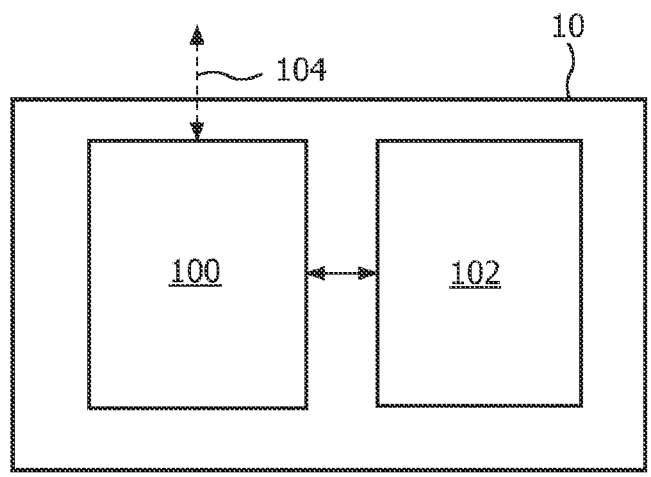
FIG. 2 shows an embodiment of a node of the lighting system of FIG. 1 according to the invention.

FIG. 2 shows an embodiment of a node 10, which comprises communication means 100 and routing decision means 102. The communications means 100 are provided for sending packets to and receiving packets from other devices, neighbored to the node 10, over a wireless communication link 104. The communication means 100 may comprise a RF communication module, such as a WLAN unit, and/or a IR communication unit. The communications means 100 are adapted to establish a communication link with a neighbored node, i.e. a node within the communication range of the means 100. Typically, the communication range is provided such that a link can be established only to nodes directly neighbored in the grid. The routing decision means 102 are provided for deciding how to forward a received packet, which is not addressed to the node 10, but to another node in the grid. The routing decision means 102 implement an algorithm, which is adapted for controlling the communication means 100 to forward the received packet to the next node of the routing path specified for routing a received packet through the grid to the destination node, and particularly to change the routing direction specified by the determined routing path according to a predetermined routing rule, when the next node of the routing path is faulty. The node of FIG. 2 can be for example implemented as an integrated circuit or micro chip for integration in a luminary in order to equip the luminary with communication and routing capabilities.

Figure 3:
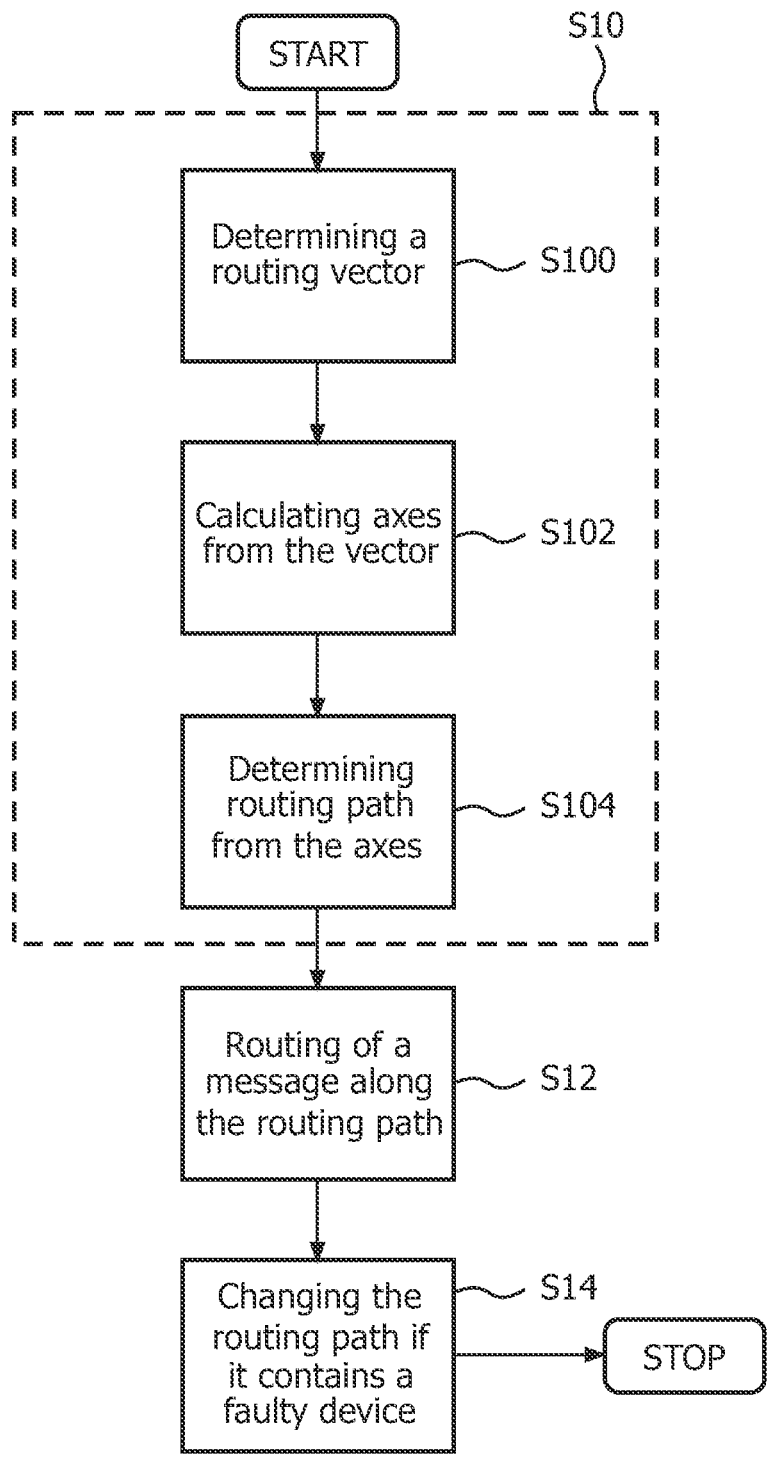
FIG. 3 shows a flowchart of an embodiment of a method for routing messages over the network of interconnected nodes of the lighting system of FIG. 1 according to the invention.

An embodiment of a flowchart of a routing method for packets through a grid of nodes according to the invention is shown in FIG. 3. The flowchart is explained with regard to FIG. 5, which shows a grid of several nodes with their positions in the grid determined by tuples of the row and column of a node. The tuples are used in the following as a designation of the respective nodes. A packet is specified to travel from sender node [4, 5] to destination node [4, 0] and another packet from sender node [2, 6] to destination node [0, 1]. A routing path from a sender node to a destination node of a packet may be determined before the packet is sent out from the sender node to the destination node. The routing path is determined in step S10 by performing the substeps S100-S104. Step S10 may be executed by a node, which for example receives local sensor findings and must control another node in the grid based on these sensor findings, or by a central controller of the lighting system, which controls the luminairies on an individual basis.

In step S100, the respective packet vectors are calculated from the positions of the sender node and the destination node in the grid and are (0, −5) and (−2, −5). A packet is routed through the grid by sending the packet from one node to one of the neighbored nodes, as indicated by the dotted arrows over nodes [4, 3], [4, 4] and [4, 5] in FIG. 5.

Figure 5:
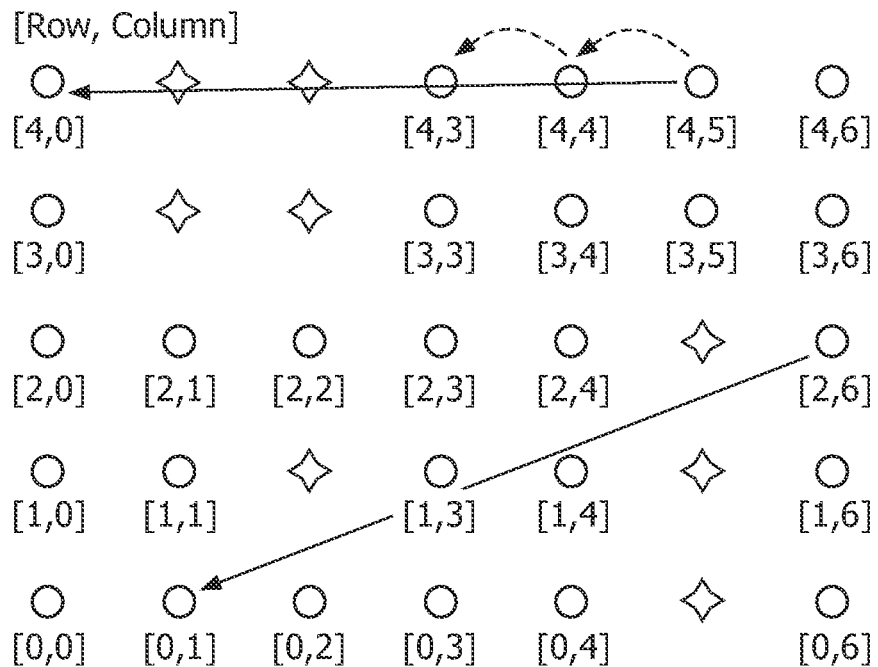
FIG. 5 shows another embodiment of a lighting system with several interconnected luminaries arranged in a grid and the routing vectors of messages sent from one device of the grid to another device according to the invention.

After determining the routing vectors, axes in the grid are calculated in step S102 from the vector coordinates of the determined packet vectors. In FIG. 5, from vector (0, −5) the two axes "0" in column direction and "−5" in row direction from the sender node [4, 5] are calculated. That means that in fact the routing path comprises merely one axis "−5" in row direction and the nodes [4, 5], [4, 4], [4, 3], [4, 2], [4, 1] and [4, 0]. From vecor (−2, −5) the two axes "−2" in column direction and "−5" in row direction can be calculated so that the routing path contains the nodes [2, 6], [1, 6], [0, 6], [0, 5], [0, 4], [0, 3], [0, 2] and [0, 1].

In the next step S104, the routing paths are determined by combining the axes determined in step S102. During the routing the selection of the each next hop is performed by moving along the axis with the largest absolute vector coordinate value. In other words, the longer one of the two axes determined from a packet vector is chosen for the beginning of the routing of a packet through the grid. In case of the vector (0, −5), the routing path is determined by only the one axis "−5" in row direction, whereas in case of the vector (−2, −5) the routing path is determined by the first longer axis "−5" in row direction and then the second shorter axis "−2" in column direction.

In the following step S12, the packets are routed along the determined routing paths by sending the packets from the sender nodes [4, 5] and [2, 6] at the beginning of the determined routing paths to the next neighbored nodes [4, 4] and [2, 5], respectively, on the routing paths. If a nodes of the determined routing paths are working, i.e. non faulty, the routing direction is determined by the routing paths and changes of the routing directions are not required. However, when a node is faulty, for example when one node cannot establish a communication link with the next neighbored node in the routing path, a change of the routing direction according to a predetermined routing rule is required in step S14, in order to achieve the destination node.

Figure 4:
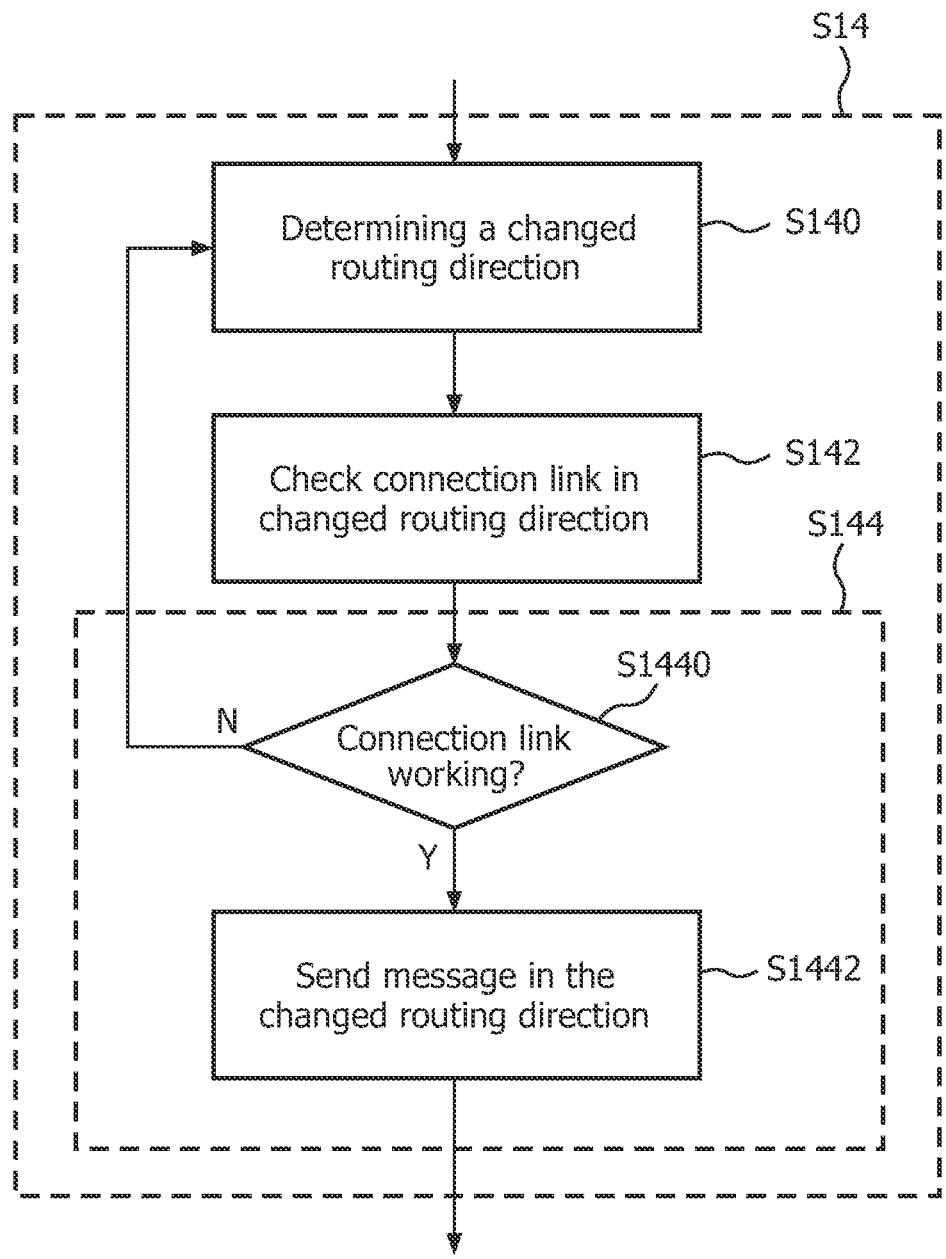
FIG. 4 shows a flowchart of an embodiment of the steps performed for changing the routing direction according to the invention.

Step S14 is executable by each node of the grid and, therefore, implemented in the routing means 102 (FIG. 2) of each node. FIG. 4 shows the substeps of step S14. A node, which determines that a change of the routing direction determined by the routing path is required for example due to a faulty communication link to the next node of the routing path, determines in a first substep S140 a changed routing direction according to the predetermined routing rule. Then, the node checks the connection link to the next node in the changed routing direction in step S142. In step S144, the node checks whether the connection link is working (substep S1440), and if the link is working, the node sends the packet in the changed routing direction (substep S1442). If the connection link in the changed routing direction is not working, the method executed by the node returns to step S140, in which the routing direction is again changed.

Figure 6:
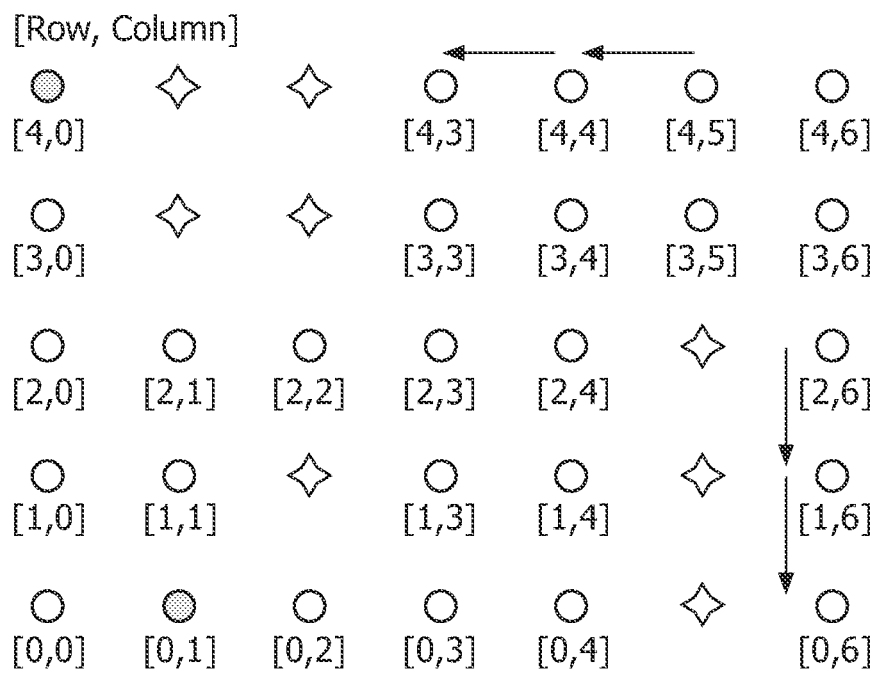
FIG. 6 shows the embodiment of FIG. 5 and the path of the messages through the grid until the messages reach faulty nodes according to the invention.
Figure 7:
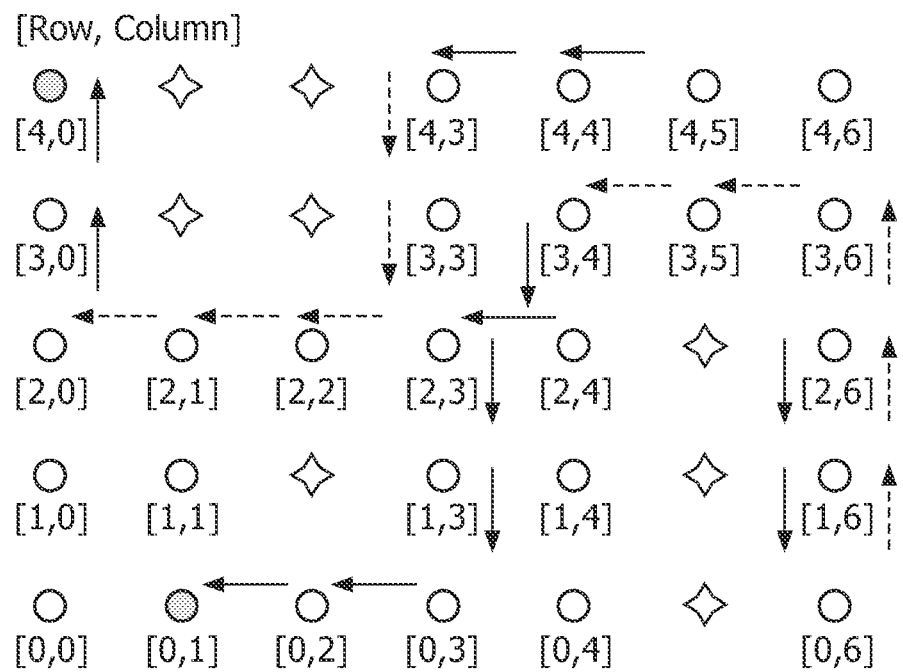
FIG. 7 shows the embodiment of FIG. 5 and the path of the messages through the grid routed around faulty nodes, which is obtained by performing a routing method according to the invention.

In an embodiment of the invention, the routing rule for changing the routing direction is predetermined in that when no progress of the packet routing can be made along the selected axis of the routing path, the other axis of the routing path is chosen as long as its value is unequal zero. When no progress is possible along both axes in the direction of the destination, a set of faulty nodes has been met. Then, a so-called "Face" routing is executed such that the packet is routed along the edge of the set of faulty nodes clockwise or anti-clockwise. The selection of the suitable clock direction is explained by the grid shown in FIG. 6, which contains several faulty nodes [2, 5], [1, 5], [0,5], [4, 2], [4, 1], [3, 2], [3, 1]. The packet sent from node [4, 5] gets stuck at node [4, 3], since nodes [4, 2] and [4, 1] are faulty and form an obstacle for the routed packet. The packet however can proceed by moving clockwise over nodes [3, 3], [2, 3], [2, 2], [2, 1], [2, 0], [3, 0] around the obstacle to node [4, 0]. The packet from node [2, 6] gets stuck at node [0, 6]. It can proceed moving anti-clockwise over nodes [3, 6], [3, 5], [3, 4], [2, 4], [1, 4], [0, 4] around the obstacle towards node [0, 1]. Choosing the opposite clock directions would lead to the packet detouring along the edge of the grid. From the moment that the packet is obstructed, the packet goes into (clockwise, or anti-clockwise) face routing mode. The packet returns to free or basic mode when it can continue its progress unhindered along the packet-vector, or in other words is returned on the routing path after circumventing the obstacle. FIG. 7 shows the face routing path with dotted arrows. Face routing starts for one packet at node [0, 6] and ends at node [3, 4], after which normal grid routing continues till node [0, 1]. For the second packet, face routing starts at node [4, 3], ends at node [2, 0] and routing concludes at node [4, 0].

In the following, the routing algorithm according to an embodiment of the invention is described in more detail with an focus on the change of the routing direction if obstacles occur on the routing path. The algorithm may be composed of the following three parts:

1. Grid routing
2. Start face routing
3. Face routing

1. Grid Routing:

Grid (or free or basic) routing for a given packet at a given node comprises the determining of a routing path from the sender node to the destination node in the grid. An algorithm for grid routing may be described as follows:

```
Calculate axis with longest distance to cover.
Determine direction d1 over that axis
If link d1 open, send packet to neighbor along d1
If link d1 closed:
    Determine direction d2 over shortest distance axis
    If (link d2 open and distance > 0) send packet to neighbor along d2
    Else start face routing
```

Thus, grid routing starts to route the packet first over the axis with the longest distance to cover (direction d1) until an obstacle occurs during the routing along that axis. In case of an obstacle, i.e. when the link to the next node is faulty, grid routing changes the routing direction in that the packet is routed in the direction of the axis with the shortest distance (direction d2) to cover. The packet is routed in direction d2 if there is no obstacle.

Figure 8:
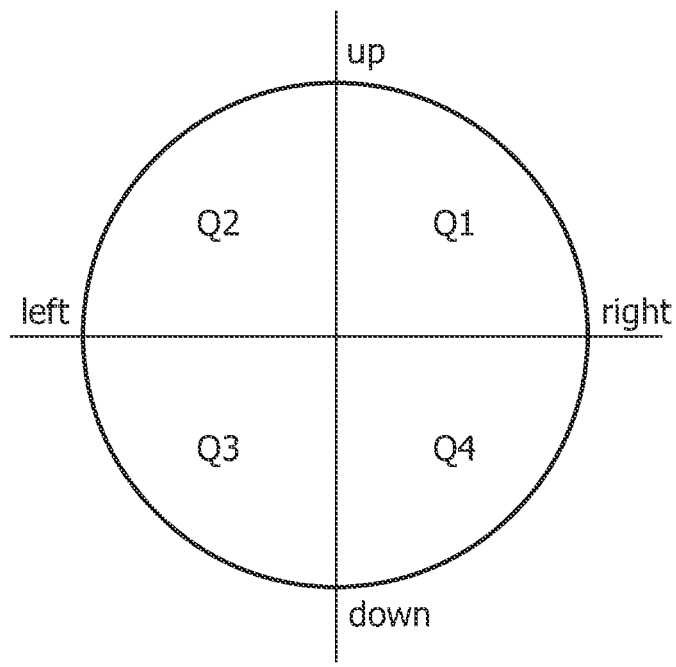
FIG. 8 shows a diagram with quadrants and directions for routing messages according to the invention.

2. Start Face Routing:

Face routing starts when progress in the quadrant specified by the packet vector is no longer possible. FIG. 8 shows four quadrants Q1 to Q4. Quadrant Q1 includes all packet vectors from right up to and not including up. Quadrant Q2 contains all packet vectors from up up to and not including left. The other quadrants are defined similarly.

For clockwise face routing, a packet with a vector in Q1 is sent over the first available link in the order up, left, and down. A packet in Q2 is sent over the first available link in the order left, down, and right. For anti-clockwise face routing, a packet with a vector in Q1 is sent over the first available link in the order down, left, and up. A packet in Q2 is sent over the first available link in the order right, down, and left. Starting face routing over the other quadrants happens similarly.

Clock Wise Direction Choice:

The choice to select clockwise or counter-clockwise is made when an edge of the grid is met together with a faulty node. At creation of the message, the clock direction is set default to clockwise. When the packet is blocked on its routing path, the default clock direction is taken over for the face routing. At meeting an edge of the grid the clock direction can be changed. The direction clockwise is chosen when packet is at row 0 with destination in Q2,
at row max with destination in Q4,
at column 0 with destination in Q1,
at column max with destination in Q3.

In all other cases at the edge the direction counter clockwise is chose. After the choice, the default clock direction is set to the newly chosen direction.

3. Face Routing:

When face routing has started, the packet arrives from a given link. When the packet is routed in a clockwise fashion, the preferred direction is to the right, followed by straight on. When the packet is routed in an anti clockwise fashion, the preferred direction is to the left, followed by straight on. When an anti-clockwise packet arrives from the left, the first available direction is chosen in the following order: up, right, and down. When an anti-clockwise packet arrives from the up, the first available direction is chosen in the following order: right, down, and left. Etc. from the other links.

When a clockwise packet arrives from the left, the first available direction is chosen in the following order: down, right, and up. When a clockwise packet arrives from the up, the first available direction is chosen in the following order: left, down, and right. Etc. from the other links.

Termination

When a node is unreachable because it is surrounded by faulty nodes, the packet loops around in the network and will revisit one of the formerly visited nodes. To prevent a large list of visited nodes in the packet, the node where the last face routing started can be stored in the packet or message, respectively. The algorithm may be implemented such that the packet may return to the node where the face routing started, when the destination node is unreachable, or that the routing is stopped when the packet returns to the node where the face routing started. Sometimes, several faces are routed and the starting node is no longer present in the packet. In order to prevent a cycling of the packet through the grid, a maximum hop count can be additionally maintained. The algorithm can then be implemented such that when the hop count is larger than the minimum hop distance of for example +20, the packet can be stopped as well.

In the following, the routing method according to the present invention is compared with a broadcast routing method.

The face routing was simulated on a grid of 50×50 nodes. The proposed grid routing performance was compared with broadcast routing, where every possible path was tried out. When a node is reachable, the broadcast routing will reach it. The test compares the number of times the routing fails and the number of extra hops that were needed compared to the minimum number of hops needed when no obstacles are present. In the grid randomly source and destinations were selected over a path with 5, 10, 15 and 20 hops. The paths were distributed randomly over the grid. Within the grid randomly chosen nodes were declared faulty. The number of faulty nodes ranged from 10 to 210 in steps of 20. The following symbols are used: FN means number of faulty nodes; PL means path length; bc means broadcast; gr means grid routing.

In general, it can be seen that for a low number of faulty nodes the broadcast path tends to be longer than the grid routing path. This is caused by the larger number of packets generated by the broadcast which leads to link conflicts and delays such that a packet using a longer path may arrive before a packet using a shorter path. No packets are lost with broadcast routing but with grid routing sometimes up to 5% of the packets are lost. For all lost packets, the packets have made a complete tour and returned to the node where face routing started. Loosing packets with grid routing and not with broadcast, has its origin in links coming up and going down. The broadcast routing tries more combinations of links more often than grid routing does. The conclusion is that for a small number of faulty nodes (<3%) (, or a set of contiguous faulty nodes) grid routing and broadcast routing always find a path when there is one. Grid routing also finds paths not far from the shortest path. With a higher number of faulty nodes (>3%), randomly distributed over the grid, grid routing loses packets although a path may have been momentarily present.

FIG. 9 shows a table with the results of the simulations for the cited conditions. All numbers are percents of the total. The entry "dead" means that either the source, or the destination are faulty. The entry "lost" indicates the number of lost packets. The entries 0, 2, 4 and >6 hops indicate the number of hops needed with respect to the smallest number of hops. The table shows that with increasing number of faulty nodes and increasing path length the number of dead and lost packets and the number of hops per packet increase.

Figure 10A:
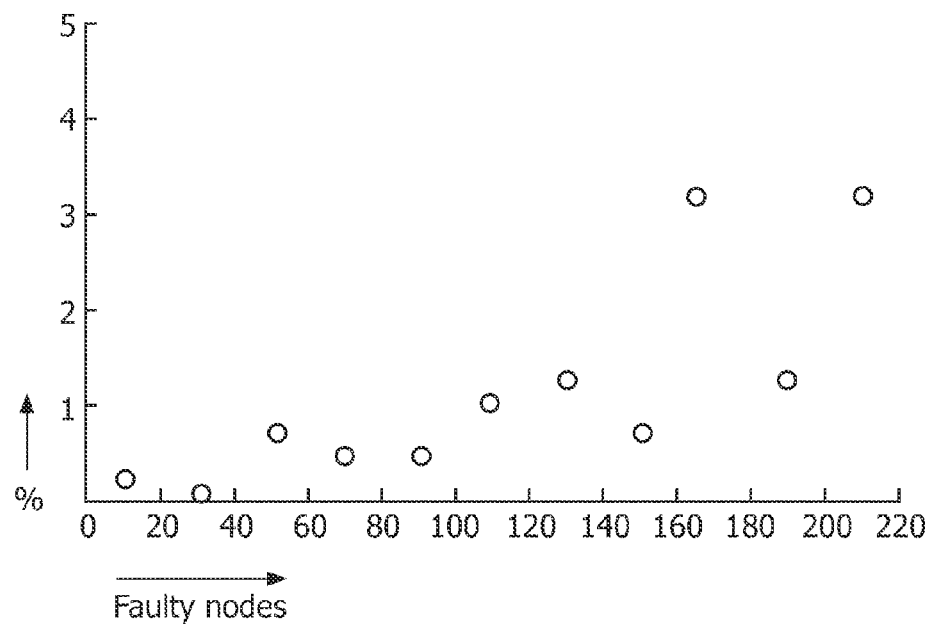
FIG. 10A shows a diagram representing the number of lost packets or messages and FIG. 10B shows a diagram representing the average hop count increase as function of a number of faulty nodes
Figure 10B:
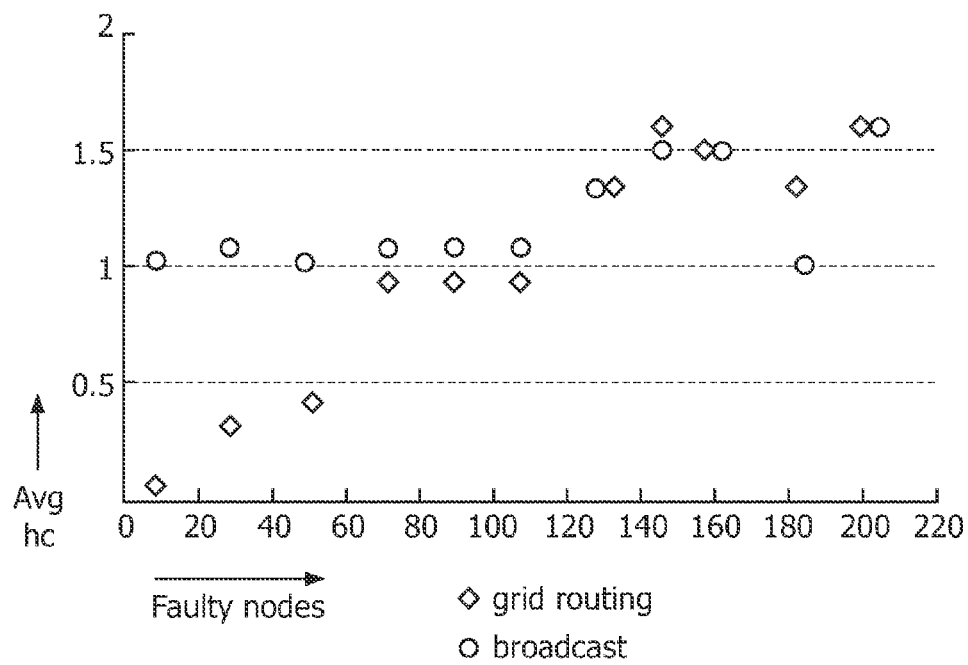

The average hop increase is calculated as avg.hc=$\Sigma_{i=1,n} \delta_i/n$, where $\delta_i$ is the hop count increase of packet i, and n is the total number of packets. In FIG. 10A, the percent of lost packets for grid routing is shown as function of the number of faulty nodes. In FIG. 10B, the average hop count increase for broadcast and grid routing is shown as function of the number faulty nodes for the case path length=20.

The invention can be applied in any networked control system such as a complex lighting system with a plurality of light sources, for example a lighting system installed in homes, shops and office applications. The invention is particularly applicable for individual control of devices of the networked control system, which are placed in an approximately rectangular grid, for example for controlling single luminairies or a group of luminairies of a complex lighting system with interconnected luminairies arranged in a grid. Examples of such environments are green houses, factory buildings, sport halls, office buildings and outdoor (matrix) light displays.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A method for routing messages over a network of interconnected devices arranged in a grid, each device being configured for routing messages between directly neighbored devices in the grid, the method comprising determining a routing path for a message from a sender device to a destination device through the grid, routing the message from the sender device to the destination device along the determined routing path through the grid, executing by at least one of the devices a change in the routing path according to a predetermined routing rule for routing the message around a faulty device contained in the determined routing path, and wherein the act of executing a change of the routing path according to a predetermined routing rule for routing the message around a faulty device contained in the determined routing path comprises performing the following acts for sending of the message from one device to a neighbored device:

a) determining a changed routing direction by application of the predetermined routing rule, b) checking a connection link to the next neighbored device in the changed routing direction, and c) if the connection link is working sending the message to the next neighbored device in the changed routing direction else repeating steps a)-c), wherein the step of determining of the changed routing direction comprises changing the routing direction in a first order of predetermined routing directions up, left, down or the reverse first order if the routing direction of the determined routing path is from right in the grid, changing the routing direction in a second order of predetermined routing directions left, down, right or the reverse second order if the routing direction of the determined routing path is from up in the grid, changing the routing direction in a third order of predetermined routing directions down, right, up or the reverse third order if the routing direction of the determined routing path is from left in the grid, changing the routing direction in a fourth order of predetermined routing directions right, up, left or the reverse fourth order if the routing direction of the determined routing path is from down in the grid.

2. The method of claim 1, wherein either the order of predetermined routing directions or the reverse order is selected as default order of changing the routing direction and the default order of changing the routing direction is switched to the reverse order if a communication link to the next neighbored device in the selected routing direction of the default order is faulty or no device exists in the selected routing direction.

* * * * *